May 5, 1925. 1,536,405

G. E. NELSON

LAND CLEARING MACHINE

Filed April 10, 1924 5 Sheets-Sheet 1

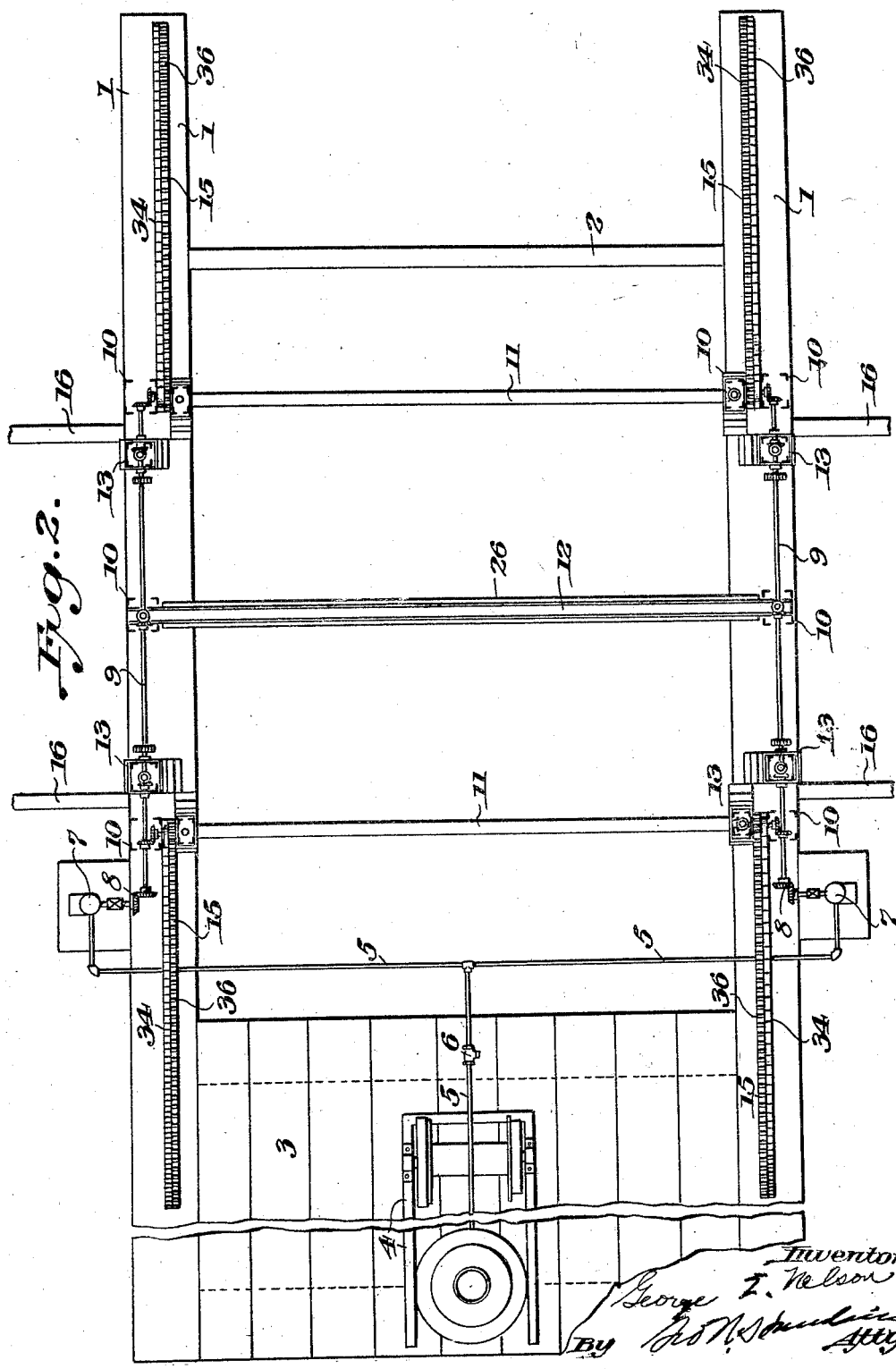

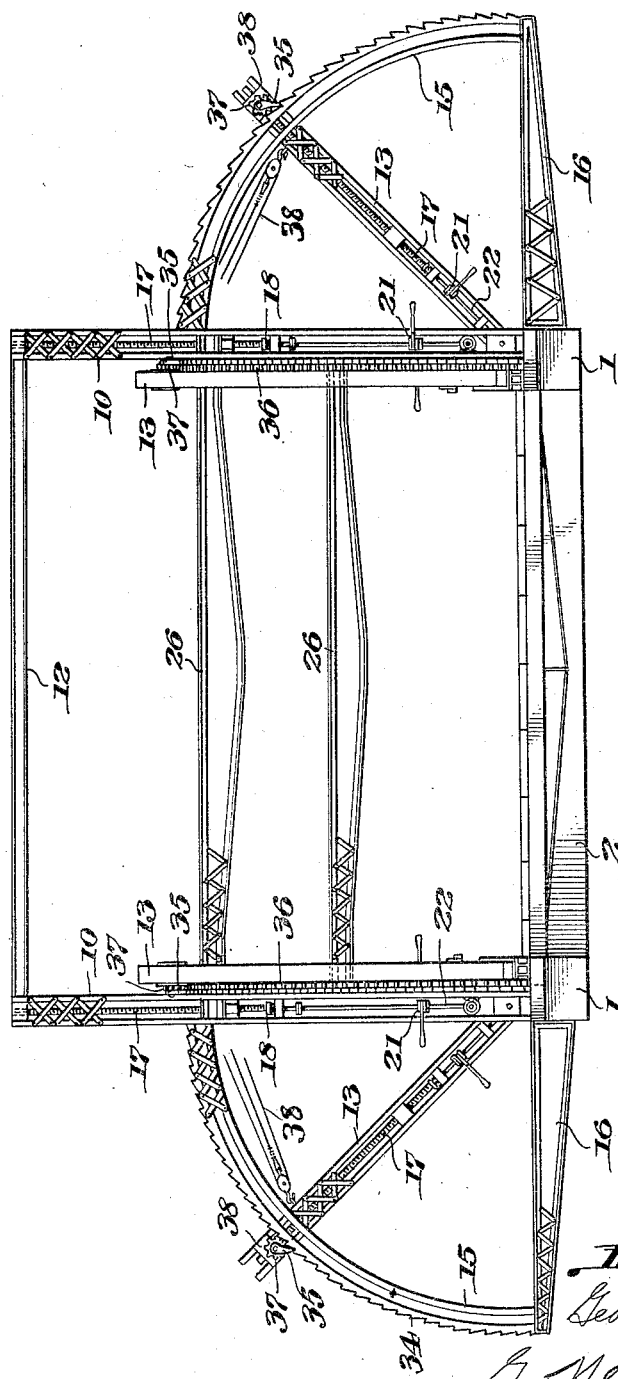

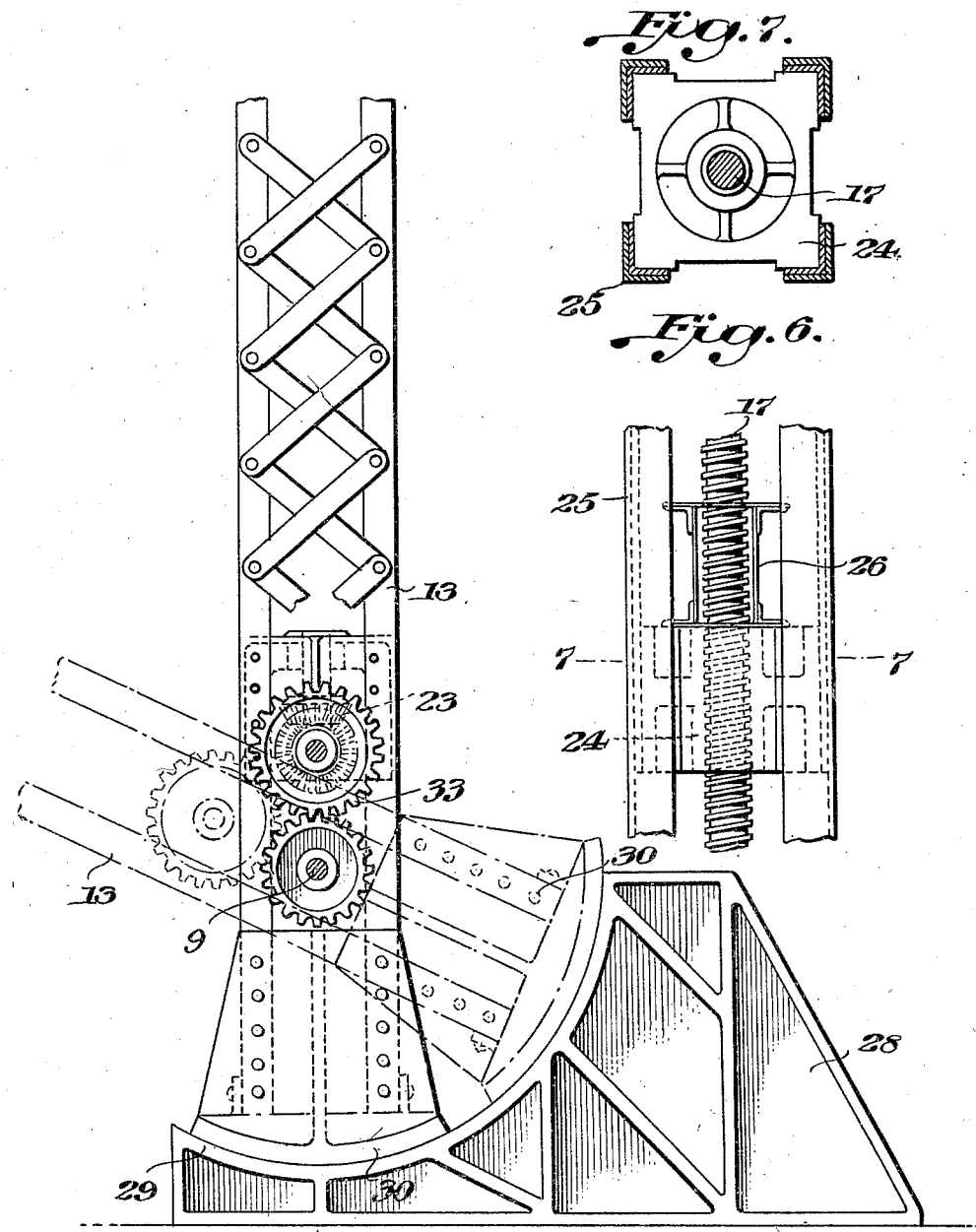

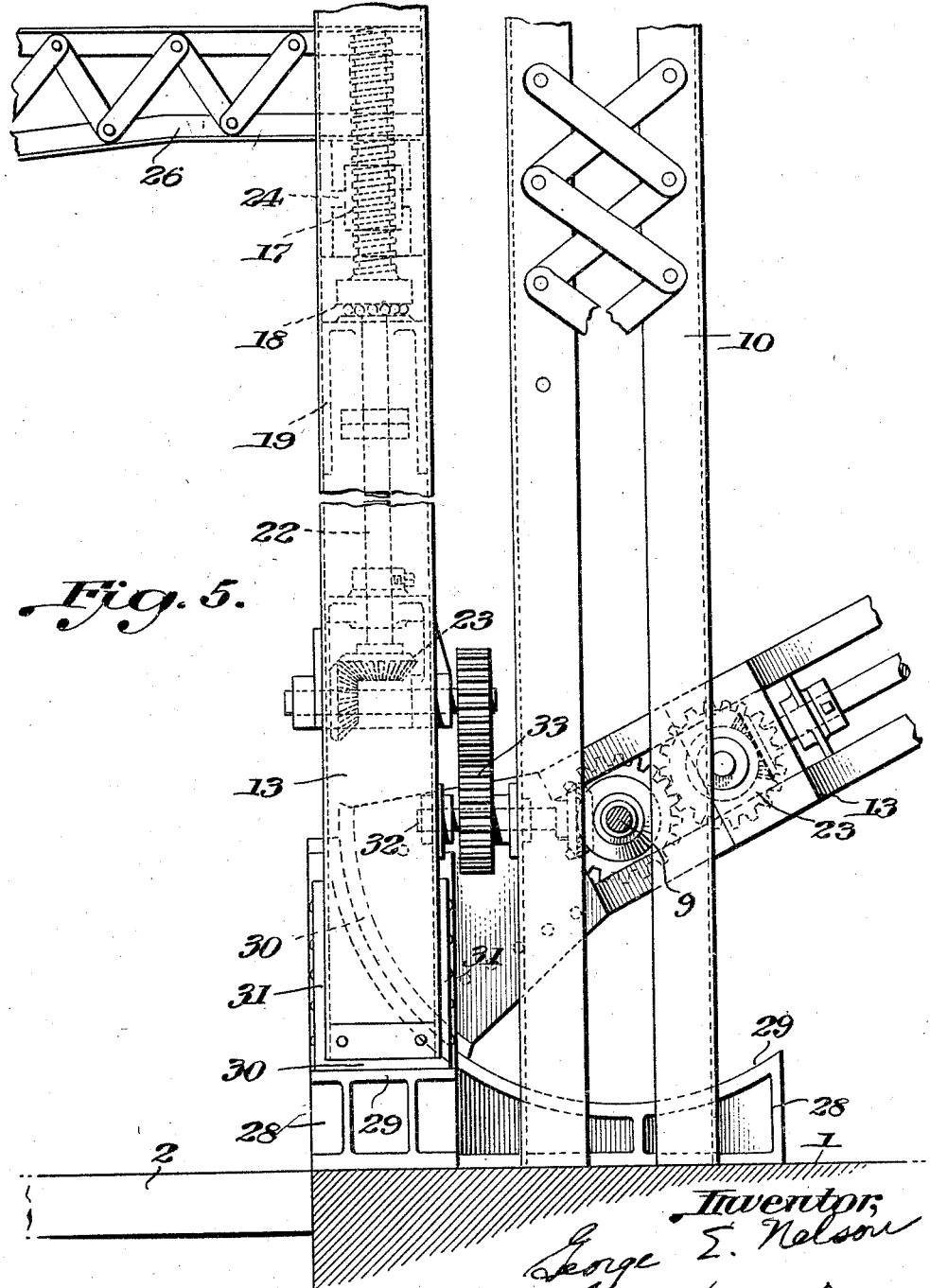

Patented May 5, 1925.

1,536,405

UNITED STATES PATENT OFFICE.

GEORGE E. NELSON, OF BROOKLYN, NEW YORK.

LAND-CLEARING MACHINE.

Application filed April 10, 1924. Serial No. 705,617.

*To all whom it may concern:*

Be it known that I, GEORGE E. NELSON, a citizen of the United States, residing at Brooklyn, in the county of Kings and State of New York, have invented certain new and useful Improvements in Land-Clearing Machines, of which the following is a specification.

This invention relates to a land clearing machine adapted for extracting stumps, broken roots lying at any angle, stones, boulders, and other objects embedded in, or lying on, land.

The present invention, which is an improvement on the machine set forth in my application filed Mar. 23, 1923, Serial No. 627,152, has for one of its objects the provision of means whereby roots disposed at any angle or in any position may be extracted from the ground without the necessity of assembling special tackle arranged to meet the requirements of the situation, resulting in a great saving of time and expense as, heretofore, the extraction of roots, particularly those lying at an angle, has been difficult, required special tackle, and it has not been an easy matter to arrange the tackle to exert a pull on a root in the direction of its length, roots have broken off, adding to the expense and difficulty of pulling them out.

The main purpose of the invention is, therefore, to provide improved means which will be adapted for adjustment or arrangement in such fashion that a pulling or drawing action may be had on a root at any angle, thus minimizing breakage of roots during the operation of extraction and insuring rapid and satisfactory operation.

My invention also contemplates the provision of improved means for pulling out stumps which only require a general vertical pull.

The invention also has for its object, to provide, in one machine, a plurality of extracting means, driven from the same source of power which will be self-contained with the machine, each extracting means being adapted for control and operation independently of the remaining extracting means and arranged so that any, or all, of said extracting means may be operated at a given time, thus enabling the extraction of stumps, roots lying at different angles, and like operations, to be simultaneously effected.

As in the machine of my application Serial No. 627,152, so in the present invention, I utilize the principle of the screw jack or jack screw in order to obtain the requisite power for extracting operations, the jack screws being arranged on opposite sides of the machine and connected by girders or lifting beams. All of the pairs of jack screws and their cross beams may be run upwardly or downwardly in a simultaneous operation or any pair may be operated independently of all other pairs.

While the principle of the jack screw is generally the same as set forth in my copending application, the manner of driving the screws and operating the cross beams or girders is different and insures better results.

The present invention represents a radical improvement over the machine of my copending application in respect to the disposition, relative arrangement, construction and operation of certain of the jack screws, driving means therefor, and cross beams or girders, the object being to so construct and arrange them and adapt them for adjustment that they may exert a pulling action at any desired angle to the horizontal so that a direct pull may be exerted on a root regardless of its angle of inclination. Certain of the adjustable or settable extracting means, embodying swingingly mounted jack screws, driving shafts, and cross beams or girders will be adapted to be swung forwardly or rearwardly in relation to the machine, whereas others are adapted to be swung laterally in relation to the machine, thus making provision for pulling actions at all angles additional to the provision for vertical pull adapted to be had by the use of those of the extracting means which are not adjustable.

Those of the extracting or pulling means which are adjustable to different angles are mounted in an improved manner to relieve their pivots of strain and to guide and strengthen them in their movements and to prevent play when an extracting operation is being carried on. They are also provided with improved means for their adjustment to different angles and securement in their adjusted positions.

Unlike the driving means provided in the machine of my application Serial No. 627,152, in the present machine the engine, boiler or power unit, is carried by the machine and the different lifting or extracting means are directly driven by shafting, with controls to enable any lifting or extracting means to be operated or stopped at will.

A practical embodiment of the invention is hereinafter described and shown in the accompanying drawings but I wish it understood that modifications may be resorted to without departing from the spirit and scope of the invention.

In the accompanying drawings:

Fig. 2 is a plan view, certain parts being broken away.

Fig. 3 is an end elevation.

Fig. 4 is a detail side elevation, partly in dotted lines and partly broken away, showing the swinging mounting and seat employed for the adjustable extracting means.

Fig. 5 is an end elevation thereof, certain parts being broken away and in dotted lines.

Fig. 6 is a detail side elevation showing one of the jack screws, sliding nut, and end of cross beam or girder; and Fig. 7 is a cross section on the line 7—7, Fig. 6.

Figure 1:
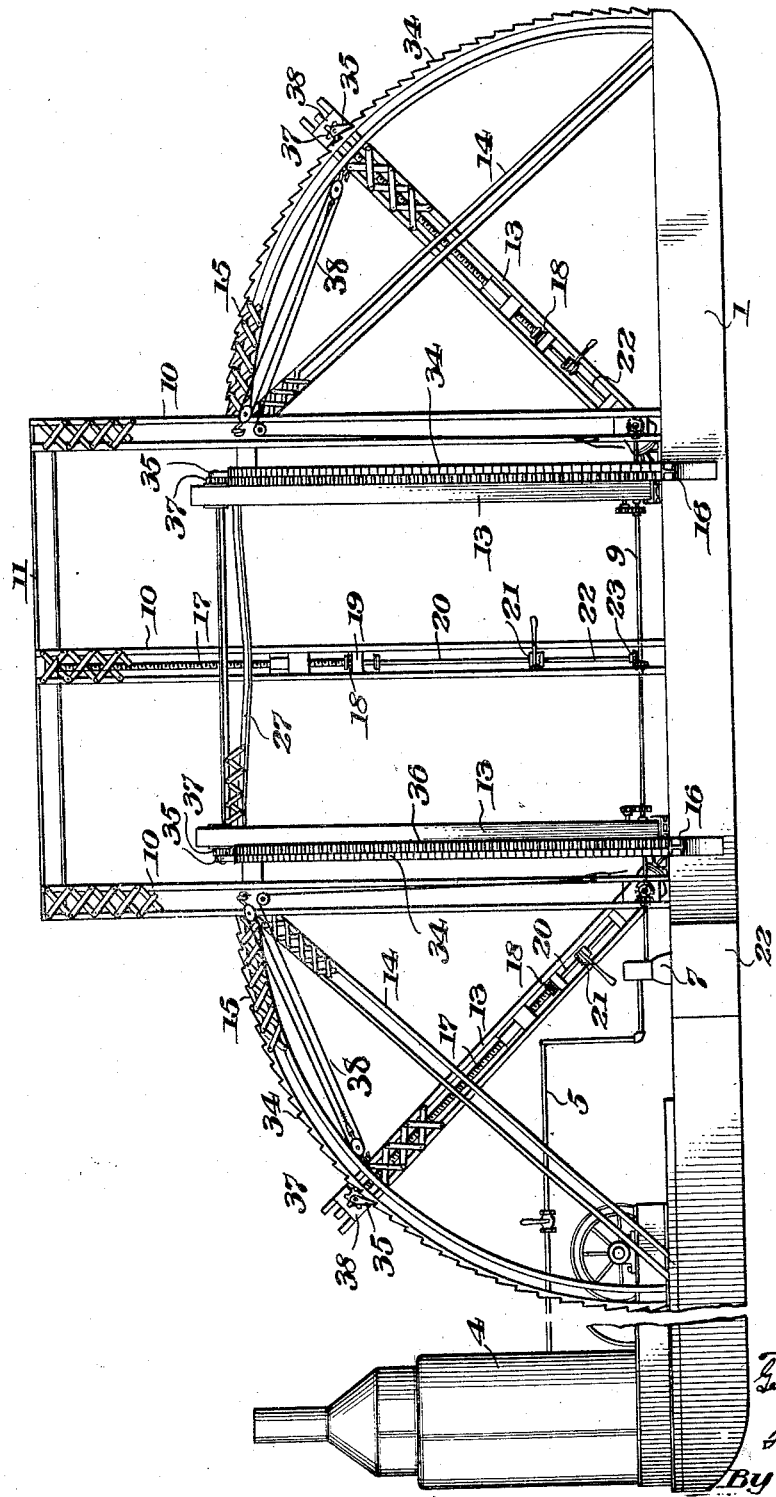
Figure 1 is a side elevation, certain parts being broken away.

My machine is so constructed that it may be taken apart for purposes of transportation and put together or erected on the land where it is to be used, thus obviating the necessity of transporting a very large and bulky machine of this character for long distances.

The operative parts are carried by a base comprising skids or runners 1, stiffened by cross beams or timbers 2, said frame preferably comprising heavy timbers. At one end the frame is provided with a platform 3 to support the boiler and engine 4 from which power is derived for purposes of operation.

The engine 4 may be of any well known or approved form having such cable drums as may be necessary for use in connection with cables for pulling the machine along from place to place as land clearing operations progress.

The boiler 4 will supply steam through pipe 5, under suitable valve control located at 6 or other point or points, to suitable engines 7 which drive, through bevel gears 8, the shafts 9 from which power is derived for the extracting or lifting means.

The extracting or lifting means now to be described, comprise columns, lifting beams or girders, jack screws and other instrumentalities which can be conveniently mounted on the skids 1 at the place of use and, when clearing operations have ceased, may be taken down and transported with the skids and braces, engine, and other instrumentalities, to any distant point and there reassembled.

The stationary or non-adjustable columns 10 are mounted on the skids 1 and are braced by upper beams 11. The columns 10 may be of any desired construction suitable for the purpose; I have shown the well known latticed construction.

The central columns 10 (and also the remaining columns 10, is desired,) are connected by cross beams 12.

The adjustable or swinging columns 13 are also of latticed construction.

The columns 10 are made rigid by inclined latticed braces 14 which are seated on the skids 1.

To provide supports for holding the swinging columns 13 by means hereinafter described, arc-shaped latticed beams 15 are provided. Certain of these beams 15 are seated on the skids 1 and connected to the columns 10 as shown in Fig. 1. Others of the arc-shaped beams 15 are seated on latticed outrigger braces 16, Figs. 1, 2 and 3.

All of the columns are provided with jack screws 17 which are seated on ball or roller bearings 18 and supported, in a revoluble manner, on fixed seats 19 permanently fastened to the columns, 10 and 13, in the respective instances. Thus the weight of the object being lifted, and the resistance encountered during extraction of a root, boulder or the like, is borne by the columns 10, or 13, as the case may be.

The jack screws are rotated by shafts 20, mounted in suitable bearings provided on the columns and provided with controlling clutches 21 by which the shafts 20 may be coupled to, or disconnected from, the countershafts 22 which carry bevel gears 23 through which said countershafts are driven from the shafts 9. It will be understood that the engines 7 simultaneously drive shafts 9 on opposite sides of the machine.

The bevel gears 23 of shafts 22 of stationary columns 10 are directly driven from shafts 9 but bevel gears 23 of adjustable columns 13 are driven by additional gears as will be presently explained in connection with Figs. 4 and 5.

The jack screws turn in the screw threads of slidable nuts 24, Figs. 6 and 7, said nuts being slidable in ways or guides 25 inside the columns.

The nuts 24 cannot rotate and hence as the screws 17 revolve, said nuts will be elevated or lowered according to the direction of rotation of said screws.

The nuts 24 constitute end supports for girders or cross beams 26 which extend from one side of the machine to the other side, connecting the corresponding jack screws 17 on opposite sides of the machine so that the weight and strain incident to lifting objects or extracting stumps or roots which is borne by said cross beams 26 will be divided between the jack screws at the ends of each beam.

Similarly, those of the jack screws 17 carried by the swinging outrigger columns best shown in Figs. 1 and 3 operate nuts 24 which support the ends of girders or beams 27, Fig. 1, which extend longitudinally of the machine so that strains and weights borne by said beams 27 are divided between the jack screws supporting them.

Preferably, all of the beams 26 and 27 are of latticed construction for the sake of lightness and strength.

The outrigger columns 13 are centered on the shafts 9 but, obviously, said shafts are inadequate to carry the great weights and pressures to which the said columns 13 are subject.

Similarly, the swinging columns 13 which are adapted to move in the direction of the length of the machine as best shown in Fig. 1, require support in their movements.

The mountings of all of the swinging columns 13 are of substantially the same construction, that shown in Figs. 4 and 5. Seats or abutments 28 are carried by the skids or runners 1, such seats or abutments being heavy castings, of such construction to properly stand the weight and strain before referred to. These abutments 28 have arcuate seats 29 lying in circles whose centers are the pivotal points for mountings of the columns 13. The columns 13 are provided with curved or arcuate shoes 30 having sides 31, said shoes lying in circles whose centers are the pivotal points of the columns. The shoes bear against and slide on the seats 29. The seats 29 and shoes 30 adequately take care of all thrusts due to lifting or extracting operations carried on by the swinging columns.

Any suitable gearing may be provided for connecting the longitudinally swinging columns 13 with the laterally swinging outrigger columns 13. One such gearing appears in Figs. 4 and 5, comprising a countershaft 32 which drives spur gears 33, in turn driving bevel gears 23.

The arc-shaped latticed beams 15 are provided with ratchet teeth 34. The swinging columns 13 have pivoted ratchets 35 (Figs. 1 and 3) which are adapted to engage the teeth 34 for the purpose of holding the columns at any angle to which they may be raised or lowered. It is within the spirit of the invention to provide other means than the ratchet teeth 34 and ratchet 35.

The beams 15 are provided with gear racks 36. The columns 13 have rotatably mounted pinions 37 which mesh with the racks 36. Any suitable means, hand-operated or power-operated, may be provided for rotating the pinions 37 for elevating and lowering the columns 13.

Block and tackle 38 may be provided for lowering and raising the columns 13 and in its broadest aspect the invention is not limited to any particular means for swinging the columns 13 to the desired angle and for holding them at that angle.

The machine provides means for direct vertical lifting of objects or extraction of stumps or roots and means for extracting roots lying at an angle to the horizontal and each extracting means is operable and controllable at will independently of all others of the extracting means but as many of the extracting means as desired may be operated simultaneously. Provision is made, therefore, for carrying on any land clearing operations desired, regardless of conditions encountered.

I claim:

1. In a land clearing machine, the combination with skids, of columns carried thereby, jack screws for the columns, nuts slidable on, and guided by, the columns, said nuts being engaged and operated by the jack screws, independent power-operated motors carried by the skids, operative connections between the respective motors and the jack screws aforesaid, a beam supported by the aforesaid nuts, and means jointly controlling said motors, whereby they may be simultaneously operated.

2. In a land clearing machine, the combination with skids separated by a free and unobstructed space, of columns rising from the respective skids, jack screws for the respective columns, nuts slidable on the respective columns and operated by the respective jack screws, horizontal beams supported by the nuts and forming a bridge above the free and unobstructed space between the skids, and means for operating the jack screws to raise or lower the beams.

3. In a land-clearing machine, the combination with a supporting frame, of a pair of swinging columns, means for swinging said pair of columns to different desired angles and for securing them in the position to which they are swung, elevating jack screws carried by the swinging columns, and a horizontally arranged beam extending from one column to the other and adapted to be raised or lowered by the jack screws.

4. In a land clearing machine, the combination with a supporting frame, of a pair of columns swingingly mounted thereon for positioning at different angles laterally in relation to said frame, elevating and lowering means carried by said columns, a beam operated by said lowering means and extending from one column to another, another pair of columns mounted on said supporting frame to swing in the direction of the length of the supporting frame, elevating means carried by the respective columns of said last named pair, a beam adapted to be raised and lowered by said elevating means, and means for positioning said pairs of columns independently of each other at any desired angle and for securing them where adjusted.

5. In a land clearing machine, the combination with a swingingly mounted column, of an arc-shaped beam having ratchet teeth, a ratchet carried by the column adapted to engage said teeth to hold the column in any position to which it may be moved, and elevating means carried by the column.

6. In a land clearing machine, the combination with a swingingly mounted column, and elevating means carried thereby, of an arc-shaped beam having a gear rack, a pinion carried by the column which meshes with the gear rack, and means adapted to turn the pinion.

7. In a land clearing machine, the combination with a swingingly mounted column, and elevating means carried thereby, of an arc-shaped beam having a gear rack, a pinion carried by the column which meshes with the gear rack, means adapted to turn the pinion, and means for securing the column to the arc-shaped beam when the column is in its different adjusted positions.

8. In a land clearing machine, the combination with a pair of swinging columns, of jack screws carried thereby, means for simultaneously turning the jack screws, a freely disposed, lifting and pulling beam or girder mounted and operated by the jack screws of the said columns, and means for raising and lowering the pair of swingingly mounted columns.

9. In a land clearing machine, the combination with a pair of swinging columns, of jack screws carried thereby, means for simultaneously turning the jack screws, a beam operated by the jack screws of the said columns, beams having arc-shaped racks, pinions carried by the swinging columns, said pinions meshing with the racks, and means adapted to turn said pinions.

10. In a land clearing machine, a swinging out-rigger elevating means comprising a pair of columns which are swingingly mounted at their lower ends, thrust bearings for the said lower ends of said columns which accept the weight of, and pressure applied to, said columns, jack screws carried by the columns and supported by them, means for turning said screws, and a beam mounted on and operated by the jack screws.

11. In a land clearing machine, a swinging out-rigger elevating means comprising a pair of columns which are swingingly mounted at their lower ends, thrust bearings for the said lower ends of said columns which accept the weight of, and pressure applied to, said columns, jack screws carried by the columns and supported by them, means for turning said jack screws, traveling nuts slidably mounted on the columns and guided by them, said nuts being engaged with the jack screws and adapted to be advanced or retracted by said screws, and a beam whose ends are supported on said nuts.

In testimony whereof I affix my signature.

GEORGE E. NELSON.